United States Patent
Hotta et al.

(10) Patent No.: US 9,966,636 B2
(45) Date of Patent: May 8, 2018

(54) BATTERY PACK AND METHOD OF INSPECTING STORAGE STATE OF SECONDARY BATTERY IN BATTERY PACK

(75) Inventors: Shin Hotta, Tokyo (JP); Atsushi Ozawa, Kanagawa (JP); Kentaro Marutani, Kanagawa (JP); Shinichi Uesaka, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 723 days.

(21) Appl. No.: 13/823,014

(22) PCT Filed: Sep. 5, 2011

(86) PCT No.: PCT/JP2011/070113
§ 371 (c)(1),
(2), (4) Date: Mar. 13, 2013

(87) PCT Pub. No.: WO2012/036005
PCT Pub. Date: Mar. 22, 2012

(65) Prior Publication Data
US 2013/0171481 A1 Jul. 4, 2013

(30) Foreign Application Priority Data
Sep. 16, 2010 (JP) ................................ P2010-207525

(51) Int. Cl.
*H01M 10/42* (2006.01)
*H01M 10/44* (2006.01)
(Continued)

(52) U.S. Cl.
CPC ..... *H01M 10/4221* (2013.01); *H01M 2/1022* (2013.01); *H01M 2/1077* (2013.01);
(Continued)

(58) Field of Classification Search
CPC ..... H01M 10/4221; H01M 2/1022; H02J 7/00
(Continued)

(56) References Cited

U.S. PATENT DOCUMENTS 6,020,082 A * 2/2000 Orlando .............. H01M 2/0267
429/7
2007/0229026 A1 10/2007 Morioka et al.
2010/0090654 A1 * 4/2010 Breiting et al. ............... 320/137

FOREIGN PATENT DOCUMENTS

JP 2007128674 5/2007
JP 2008021619 1/2008
(Continued)

OTHER PUBLICATIONS

Office Action for EP Patent Application No. 11825011.7, dated Dec. 20, 2017, 5 pages.

*Primary Examiner* — James Lee
(74) *Attorney, Agent, or Firm* — Chip Law Group

(57) ABSTRACT

A battery pack is provided. The battery pack has a plurality of secondary batteries and an inspection circuit. When the plurality of secondary batteries are classified into a first secondary battery group configured of secondary batteries selected from the plurality of secondary batteries and a second secondary battery group configured of remaining secondary batteries not belonging to the first secondary battery group, the inspection circuit creates a first data string of the secondary batteries configuring the second secondary battery group, based on a predetermined arithmetic rule, from identification marks of the secondary batteries configuring the first secondary battery group, obtains a second data string by examining identification marks of the secondary batteries configuring the second secondary battery group, subsequently compares the first data string with the second (Continued)

data string, and stops a function of the battery pack when the first data string and the second data string do not match.

9 Claims, 9 Drawing Sheets

(51) Int. Cl.
*H01M 10/48* (2006.01)
*H01M 2/10* (2006.01)
*H01M 10/0525* (2010.01)

(52) U.S. Cl.
CPC ..... *H01M 10/425* (2013.01); *H01M 10/4207* (2013.01); *H01M 10/441* (2013.01); *H01M 10/482* (2013.01); *H01M 10/0525* (2013.01)

(58) Field of Classification Search
USPC .................. 429/50, 97, 90; 702/63; 320/106
See application file for complete search history.

(56) References Cited

FOREIGN PATENT DOCUMENTS

| | | |
|---|---|---|
| JP | 2009151953 | 7/2009 |
| JP | 2010218705 | 9/2010 |

* cited by examiner

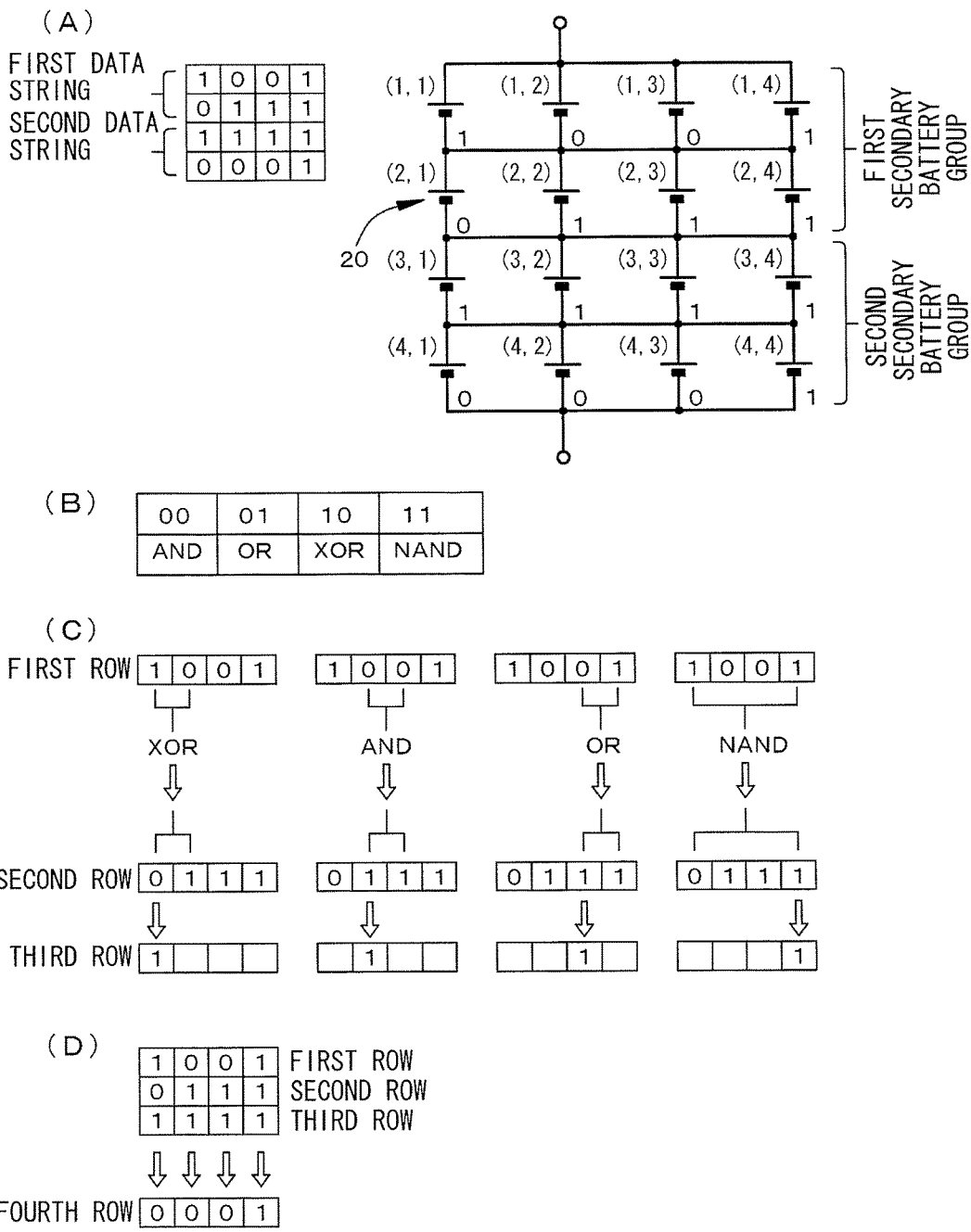

[ FIG. 2 ]
(A)
| 1 | 0 | 0 | 1 |
|---|---|---|---|
| 0 | 1 | 1 | 1 |
| 1 | 1 | 1 | 1 |
| 0 | 0 | 0 | 1 |
(B)
| 0 | 0 | 0 | 1 |
|---|---|---|---|
| 0 | 1 | 1 | 1 |
| 1 | 1 | 1 | 1 |
| 0 | 0 | 0 | 1 |
(C)
| 0 | 0 | 0 | 1 |
|---|---|---|---|
| 0 | 1 | 1 | 1 |
| 0 | 1 | 1 | 1 |
| 0 | 0 | 0 | 1 |
(D)
| 1 | 0 | 0 | 1 |
|---|---|---|---|
| 0 | 0 | 1 | 1 |
| 1 | 1 | 1 | 1 |
| 0 | 0 | 0 | 1 |
(E)
| 1 | 0 | 0 | 1 |
|---|---|---|---|
| 0 | 0 | 1 | 1 |
| 0 | 0 | 1 | 1 |
| 1 | 0 | 0 | 1 |

[ FIG. 3 ]
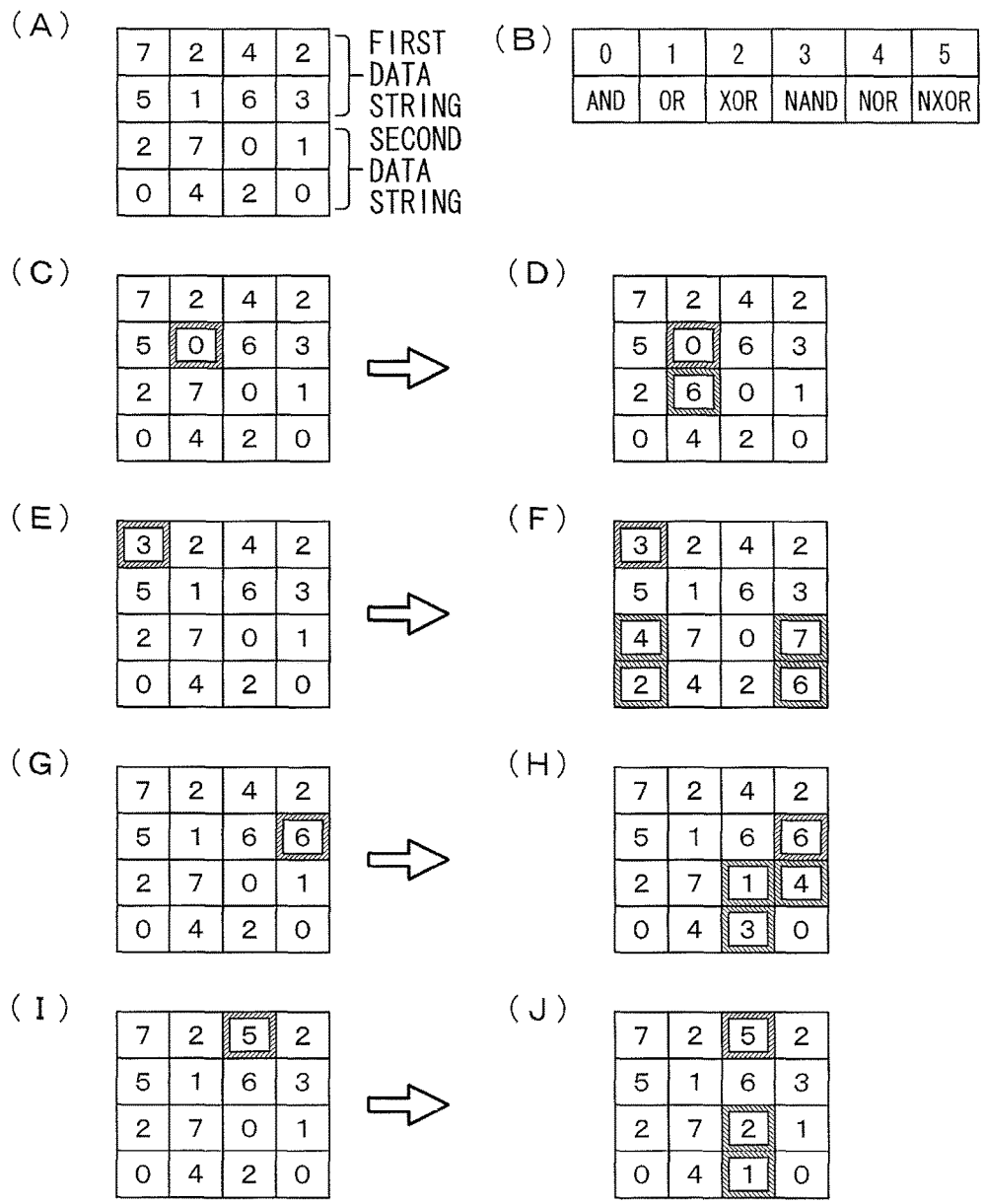

[FIG. 4]
(A)
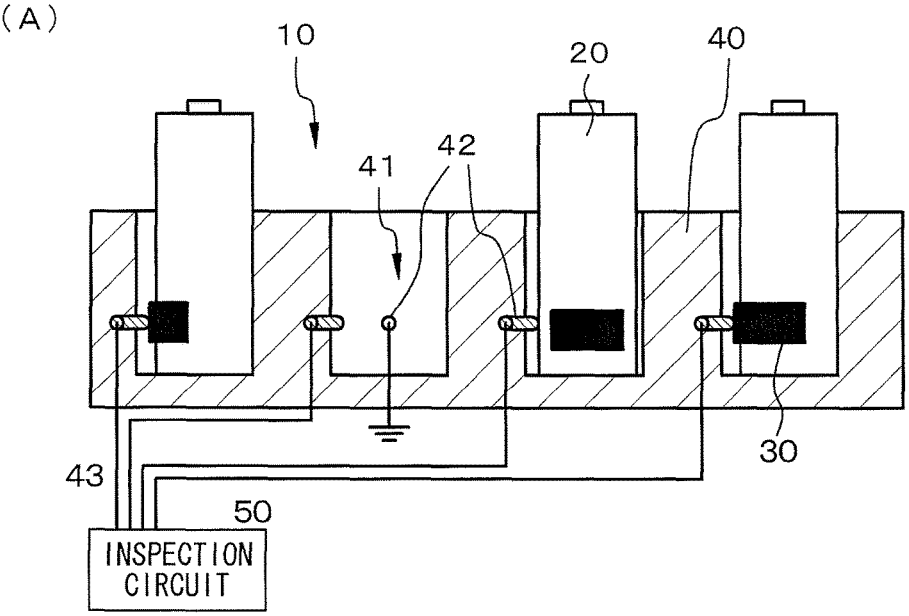
(B)
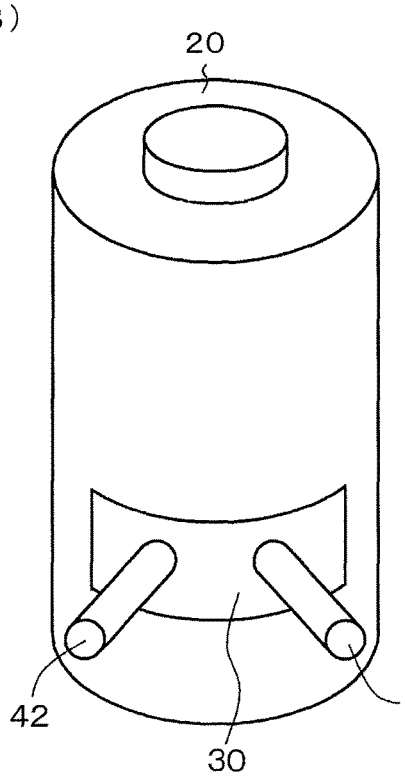
(C)
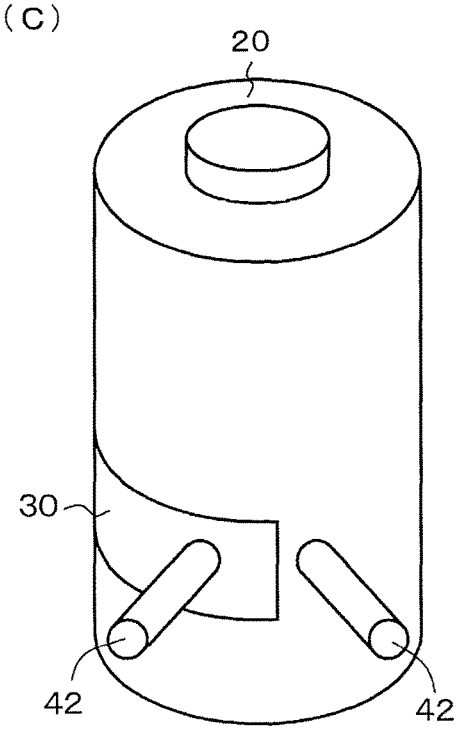

[ FIG. 5 ]
(A)
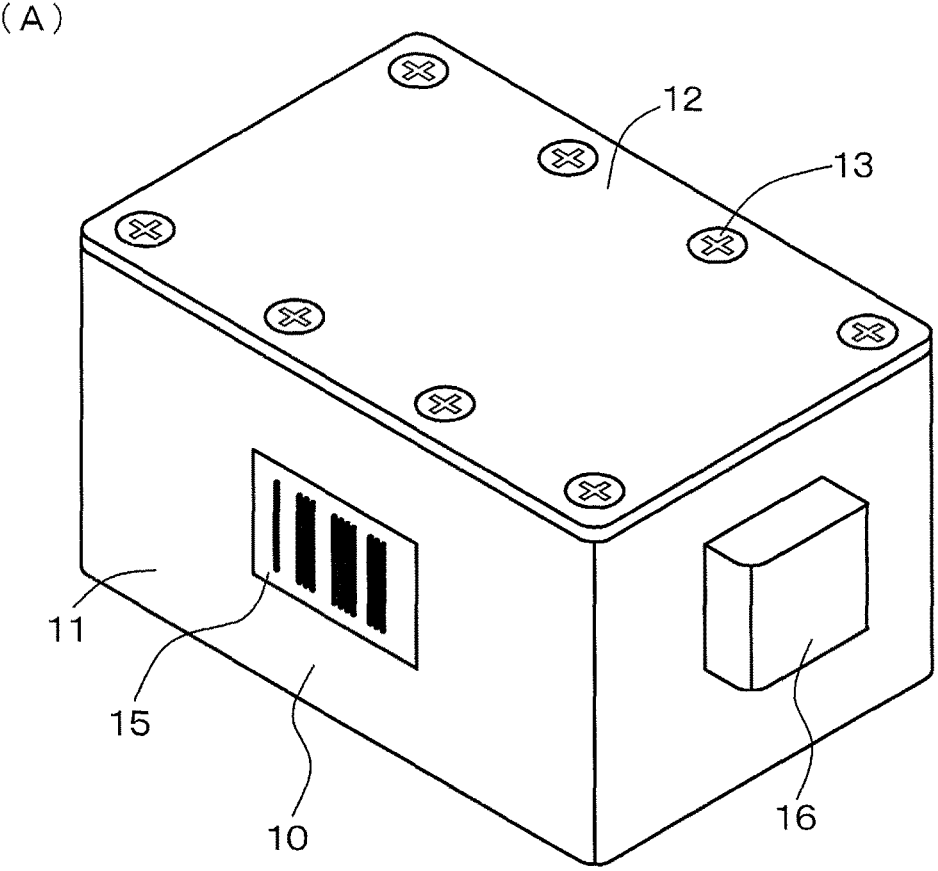
(B)
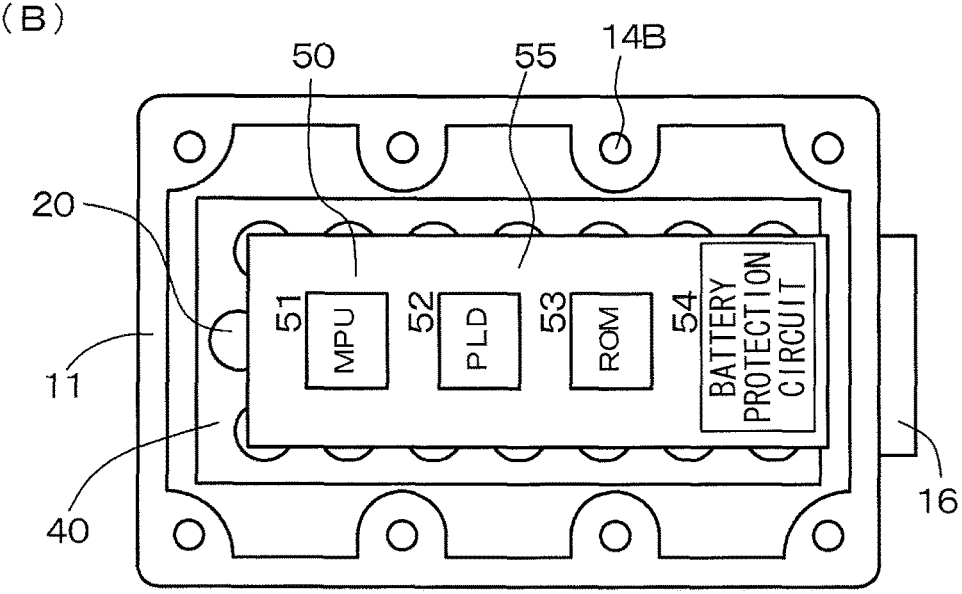

[ FIG.6 ]
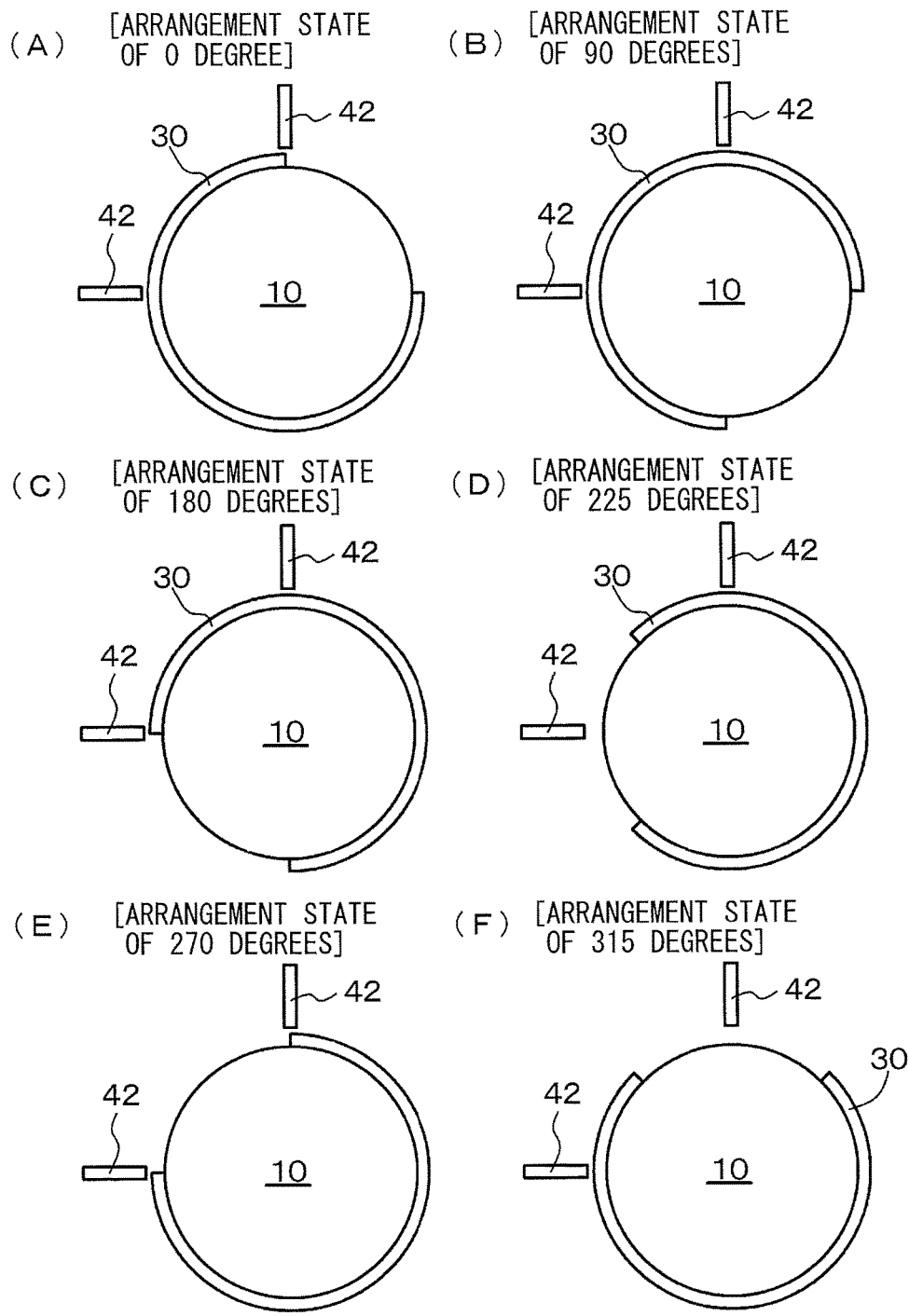

[ FIG. 7 ]
(A)
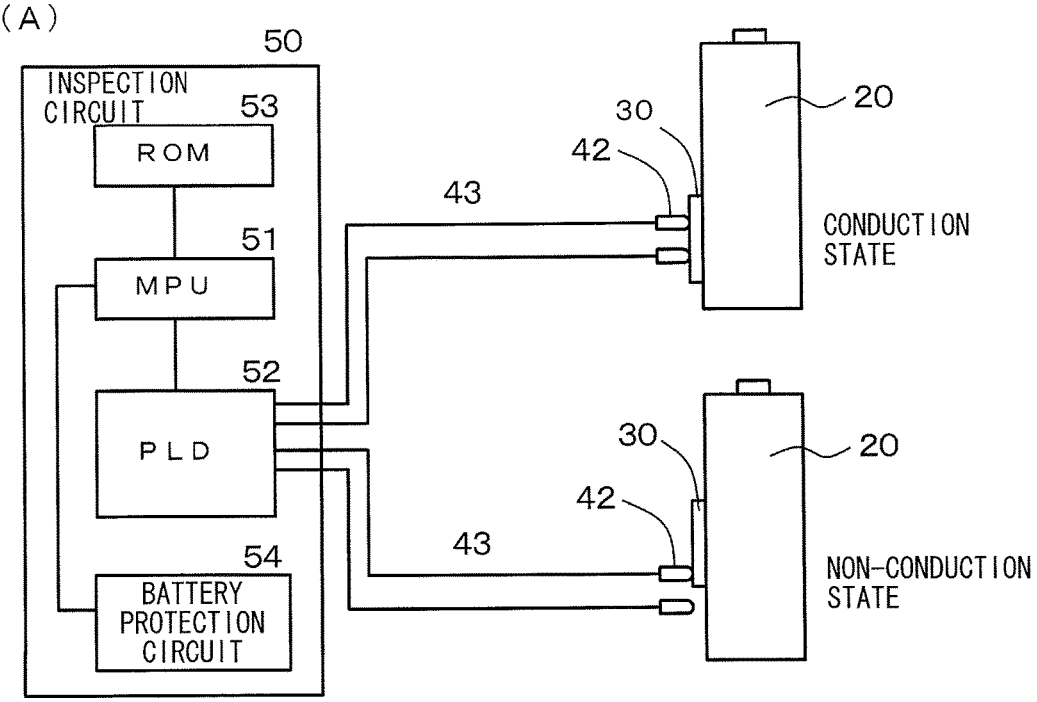
(B)
OUTPUT OF INSPECTION SIGNAL
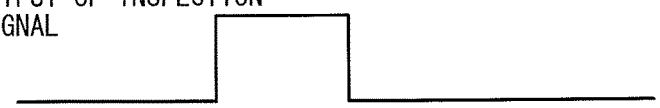
RETURN OF INSPECTION SIGNAL        CONTACT STATE:DATA "1"
RETURN OF INSPECTION SIGNAL        NON-CONTACT STATE:DATA "0"

[ FIG. 8 ]
(A)
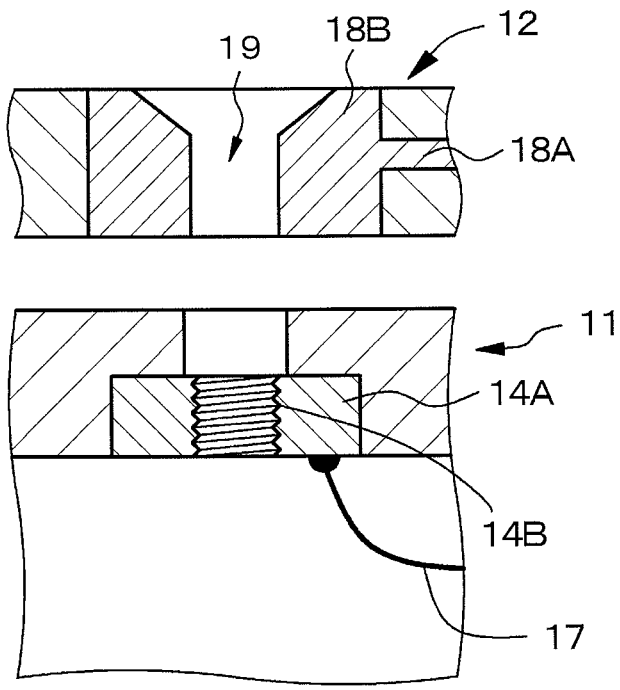
(B)
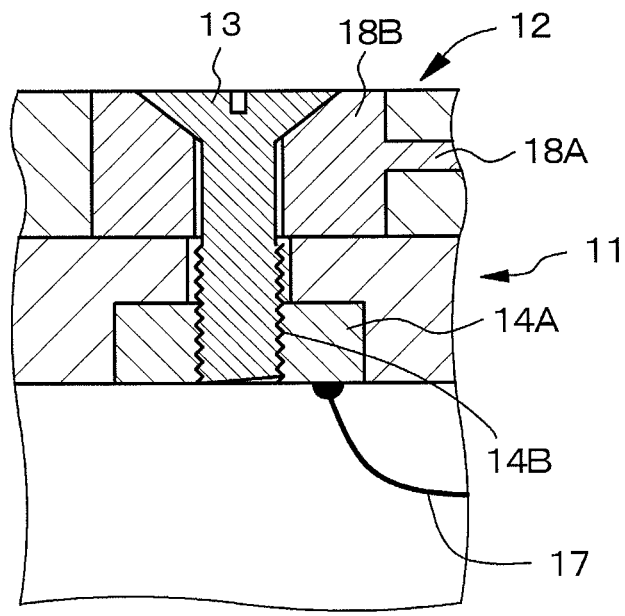

[ FIG.9 ]
(A) 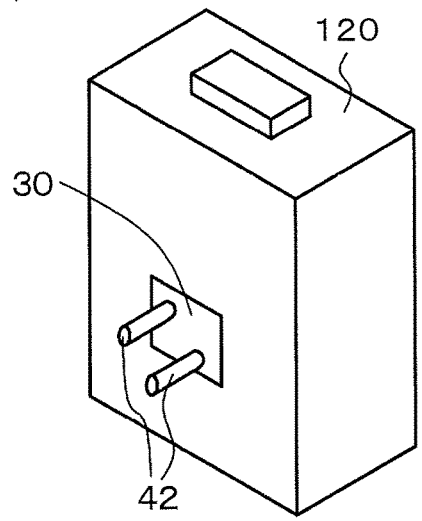
(B) 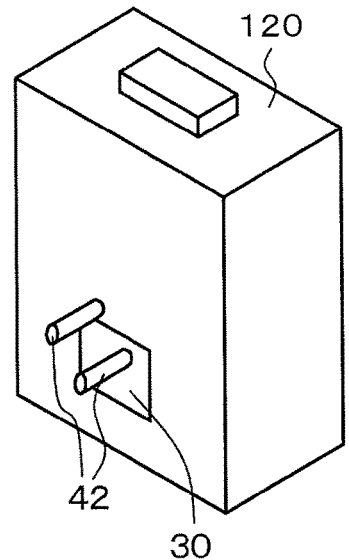
(C) 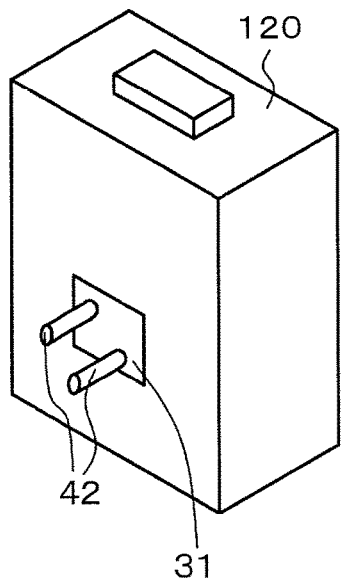
(D) 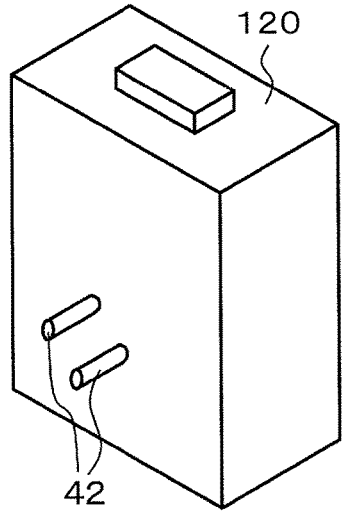

BATTERY PACK AND METHOD OF INSPECTING STORAGE STATE OF SECONDARY BATTERY IN BATTERY PACK

CROSS REFERENCES TO RELATED APPLICATIONS

The present application is a national stage of International Application No. PCT/JP2011/070113 filed on Sep. 5, 2011 and claims priority to Japanese Patent Application No. 2010-207525 filed on Sep. 16, 2010, the disclosure of which is incorporated herein by reference.

BACKGROUND

The present invention relates to a battery pack, and to a method of inspecting a storage state of a secondary battery in a battery pack.

A battery pack has been heretofore used for various portable apparatuses such as a mobile phone, a digital still camera, a portable game machine, a notebook personal computer, and an electric power tool. Currently, applications thereof are not limited thereto, and the battery pack has been increasingly used in the fields necessitating a higher output and a higher capacity such as an electric assist bicycle, an electric vehicle, and further, a home electric storage device.

A lithium ion secondary battery is one of the most-mainly-used secondary batteries as secondary batteries built into a battery pack. The lithium ion secondary battery has multiple characteristics as follows. That is, the lithium ion secondary battery is repeatedly usable by charging, has a high voltage output, has high energy density, has little self-discharge, and has a long life. Therefore, the lithium ion secondary battery is used in an extremely-broad range. However, since the lithium ion secondary battery contains a combustible material, adequate care is necessary in handling thereof. Further, for addressing needs of apparatuses such as a higher output and a higher capacity, the number of cases in which secondary batteries (single cells) are multiply-series-connected or multiply-parallel-connected, and are used in a state of a battery pack (assembled battery) is increased, and therefore, more proper handling thereof is desired. Furthermore, in order to determine whether or not a battery pack mounted on an apparatus is safely usable for the apparatus, many battery certification systems for acting certification between an apparatus and a battery pack have been introduced. Accordingly, usage of an inappropriate battery pack is allowed to be restricted by various certification methods including whether or not an appropriate battery pack is used and whether or not an appropriate protection circuit is included.

There is concern that what we call an altered battery pack is manufactured and distributed by disassembling a spent battery pack, to take out a secondary battery, and to build the secondary battery into another battery pack. In such an altered battery pack, undesired over-charge, undesired over-discharge, and/or the like may occur by inappropriately combining secondary batteries, and therefore, a safety issue easily occurs. Therefore, it is strongly desired to appropriately suppress manufacture and distribution of the altered battery pack, for example, by disqualifying such an altered battery pack or substantially disabling a function of the altered battery pack.

A battery pack with an approval function is known from, for example, Japanese Unexamined Patent Application Publication No. 2009-151953. A battery pack (1) disclosed in the foregoing unexamined patent publication is a battery pack having a battery (14) capable of being charged and discharged, and being built into an electronic apparatus (2). The battery pack is characterized in that the battery pack has a certification means (6) that communicates with the electronic apparatus (2) and that implements certification according to a cryptographic algorithm using a code key (8) shared with the electronic apparatus (2). The battery pack is further characterized in that in the case where a remaining battery level detection circuit (10) capable of detecting a remaining level of the battery (14) is included in the battery pack (1), the certification means (6) is mounted in the remaining battery level detection circuit (10) as software or hardware.

CITATION LIST

Patent Literature

[PLT 1]: Japanese Unexamined Patent Application Publication No. 2009-151953

SUMMARY

However, in PLT 1, the code key (8) is included in the certification means (6). Therefore, in the case where the code key (8) is revealed in some way, it may not be possible to prevent taking out a battery from a battery pack and manufacturing an altered battery pack. In other words, there is an issue that, in the case where a kind of fixed (that is, previously determined) information on a battery pack is stored in the battery pack, if such information is read out, it may not be possible to prevent manufacture of an altered battery pack.

Therefore, it is an object of the present invention to provide a battery pack capable of preventing manufacture of an altered battery pack by a simple configuration and a simple structure, and to provide a method of inspecting a storage state of a secondary battery in such a battery pack.

A battery pack of the present invention to achieve the foregoing object includes: a plurality of secondary batteries; and an inspection circuit. Each of the secondary batteries is previously given an identification mark. When the plurality of secondary batteries are classified into a first secondary battery group and a second secondary battery group, the first secondary battery group being configured of secondary batteries selected from the plurality of secondary batteries, and the second secondary battery group being configured of remaining secondary batteries not belonging to the first secondary battery group, the inspection circuit creates a first data string of the secondary batteries configuring the second secondary battery group, based on a predetermined arithmetic rule, from the identification marks of the secondary batteries configuring the first secondary battery group, obtains a second data string by examining the identification marks of the secondary batteries configuring the second secondary battery group, subsequently compares the first data string with the second data string, and stops a function of the battery pack when the first data string and the second data string do not match.

A method of inspecting a storage state of a secondary battery according to a first embodiment of the present invention to achieve the foregoing object (hereinafter abbreviated to "inspecting method according to the first example of the present invention" in some cases) is a method of inspecting a storage state of a secondary battery in a battery pack, the battery pack with a plurality of secondary batteries and an inspection circuit, the method including, when the plurality of secondary batteries are classified into a first secondary battery group and a second secondary battery group, the first secondary battery group being configured of secondary batteries selected from the plurality of secondary batteries, the second secondary battery group being configured of remaining secondary batteries not belonging to the first secondary battery group, and the secondary batteries each being given an identification mark previously, allowing the inspection circuit to create a first data string of the secondary batteries configuring the second secondary battery group, based on a predetermined arithmetic rule, from the identification marks of the secondary batteries configuring the first secondary battery group, to obtain a second data string by examining the identification marks of the secondary batteries configuring the second secondary battery group, subsequently to compare the first data string with the second data string, and to stop a function of the battery pack when the first data string and the second data string do not match.

A method of inspecting a storage state of a secondary battery according to a second embodiment of the present invention to achieve the foregoing object (hereinafter abbreviated to "inspecting method according to the second embodiment of the present invention" in some cases) is a method of inspecting a storage state of a secondary battery in a battery pack, the battery pack with a plurality of secondary batteries and an inspection circuit, the method including, when the plurality of secondary batteries are classified into a first secondary battery group and a second secondary battery group, the first secondary battery group being configured of secondary batteries selected from the plurality of secondary batteries, and the second secondary battery group being configured of remaining secondary batteries not belonging to the first secondary battery group, in charging the secondary batteries, allowing the inspection circuit to form a charge current change in the secondary batteries configuring the first secondary battery group into data to create a first data string of the secondary batteries configuring the second secondary battery group based on a predetermined arithmetic rule, to form a charge current change in the secondary batteries configuring the second secondary battery group into data to obtain a second data string, subsequently to compare the first data string with the second data string, and to stop a function of the battery pack when the first data string and the second data string do not match.

In the battery pack of the present invention or the inspecting method according to the first embodiment of the present invention, the first data string of the secondary batteries configuring the second secondary battery group is created, based on the predetermined arithmetic rule, from the identification marks (identification mark information or indexes) of the secondary batteries configuring the first secondary battery group, and the second data string is obtained by examining the identification marks of the secondary batteries configuring the second secondary battery group. Further, in the inspecting method according to the second embodiment of the present invention, the charge current change in the secondary batteries configuring the first secondary battery group is formed into data to create the first data string of the secondary batteries configuring the second secondary battery group based on the predetermined arithmetic rule, and the charge current change in the secondary batteries configuring the second secondary battery group is formed into data to create the second data string. That is, it is not necessary to store the first data string in the inspection circuit and to store an arrangement state of the secondary batteries in the inspection circuit, and it is enough that only a predetermined operation rule is stored in the inspection circuit. In other words, it is not necessary to store kind of fixed (that is, previously-determined) information of the battery pack in the battery pack. Therefore, it is possible to easily, appropriately, and highly safely detect alteration of a battery pack that is an attempt to improperly replace a secondary battery, and to securely prevent manufacture of an altered battery pack. Further, in the case where a secondary battery, a printed board including an inspection circuit, and/or the like is replaced by a manufacturer and/or the like, it is not necessary to rewrite various information.

Additional features and advantages are described herein, and will be apparent from the following Detailed Description and the figures.

BRIEF DESCRIPTION OF THE FIGURES

FIG. 1 Parts (A) to (D) of FIG. 1 are diagrams illustrating an arrangement and the like of secondary batteries configuring a first secondary battery group and a second secondary battery group for explaining a method of inspecting a storage state of a secondary battery in a battery pack according to Example 1.

FIG. 2 Parts (A) to (E) of FIG. 2 are diagrams for explaining change of a first data string and a second data string in the case where a secondary battery is taken out from a storage section and a/the secondary battery is stored in the storage section again in the method of inspecting a storage state of a secondary battery in the battery pack according to Example 1.

FIG. 3 Parts (A) to (J) of FIG. 3 are diagrams for explaining change of the first data string and the second data string in the case where a secondary battery is taken out from a storage section and a/the secondary battery is stored in the storage section again in a modification of the method of inspecting a storage state of a secondary battery in the battery pack according to Example 1.

FIG. 4 Parts (A) to (C) of FIG. 4 are a schematic cross-sectional view of a housing section configuring the battery pack according to Example 1 and schematic perspective views of a cylindrical-type secondary battery.

FIG. 5 Parts (A) and (B) of FIG. 5 are a schematic perspective view of a battery pack and a schematic view in a state that a cover of the battery pack is removed, respectively.

FIG. 6 Parts (A) to (F) of FIG. 6 are diagrams schematically illustrating arrangement states of a secondary battery in the battery pack according to Example 1 and states of contact between detection sections and a conductive member.

FIG. 7 Parts (A) and (B) of FIG. 7 are a conceptual diagram of an inspection circuit and the like in the battery pack according to Example 1 and a diagram illustrating an output of an inspection signal and the like.

FIG. 8 Parts (A) and (B) of FIG. 8 are schematic and partial cross-sectional views of a main body section, a closing member, and the like.

FIG. 9 Parts (A) to (D) of FIG. 9 are schematic perspective views of a rectangular cylindrical secondary battery.

DETAILED DESCRIPTION

The present invention will be hereinafter described based on examples with reference to the drawings. However, the present invention is not limited to the examples, and various numerical values and various materials in the examples are exemplifications. It is to be noted that the description will be given in the following order.
1. General Description of Battery Pack of Present Invention and Inspecting methods according to First Embodiment and Second Embodiment of Present Invention
2. Example 1 (Battery Pack of Present Invention and Inspecting method according to First Embodiment of Present Invention)
3. Example 2 (Battery Pack of Present Invention and Inspecting method according to Second Embodiment of Present Invention) and Others

[General Description of Battery Pack of Present Invention and Inspecting methods according to First Embodiment and Second Embodiment of Present Invention] In the battery pack of the present invention and the battery pack in the inspecting method according to the first embodiment or the second embodiment of the present invention, when the number of the plurality of secondary batteries is $N_0$ and the number of the secondary batteries configuring the first secondary battery group is $N_1$, a configuration may be employed in which $2 \leq N_0$ and $0.25 \leq N_1/N_0 \leq 0.75$ are satisfied, and a configuration may be preferably employed in which $0.4 \leq N_1/N_0 \leq 0.6$ is satisfied. It is to be noted that where the number of the secondary batteries configuring the second secondary battery group is $N_2$, $N_0 = N_1 + N_2$ is satisfied.

The battery pack of the present invention including the foregoing preferred configuration or the battery pack in the inspecting method according to the first embodiment of the present invention further includes a housing having a plurality of storage sections, the respective storage sections including the secondary batteries. A conductive member as an identification mark is attached to an outer surface of each of the secondary batteries made of a non-conductive material. Each of the respective storage sections is provided with two or more detection sections. Depending on a storage state of each of the secondary batteries in each of the storage sections, two detection sections are in contact with the conductive member, or one or more detection sections are not in contact with the conductive member. It is to be noted that the foregoing mode is referred to as "battery pack of the present invention or the like" for convenience.

It is to be noted that, in the battery pack of the present invention and the inspecting method according to the first embodiment of the present invention, the inspection circuit creates the first data string by examining the identification marks of the secondary batteries configuring the first secondary battery group, and obtains the second data string by examining the identification marks of the secondary batteries configuring the second secondary battery group. However, in the foregoing battery pack of the present invention or the like, specifically, the inspection circuit may obtain the second data string by examining a contact state/a non-contact state by two detection sections, and may obtain a data string (after-mentioned first secondary battery group data string) for creating the first data string. That is, examining the identification marks of the secondary batteries specifically represent examining whether two detection sections are in contact with the conductive member or one or more detection sections are not in contact with the conductive member. That is, a contact state/a non-contact state is examined with two detection sections.

The battery pack of the present invention or the like is a battery pack having a simple structure and a simple configuration in which the conductive member is attached to the outer surface of each of the secondary batteries made of a non-conductive material (insulating material) and each of the respective storage sections is provided with two or more detection sections. However, taking out a secondary battery and re-storage of a/the secondary battery are allowed to be recognized. Therefore, alteration of a battery pack such as improper replacement of a secondary battery is allowed to be appropriately and easily detected, and manufacturing an altered battery pack is allowed to be securely prevented.

In the battery pack of the present invention or the like, a mode may be employed in which the conductive member is attached to the outer surface of the secondary battery so that a probability of a case in which two detection sections are in contact with the conductive member and a probability of a case in which one or more detection sections are not in contact with the conductive member become a predetermined value depending on a storage state of the secondary batteries in the storage sections. In this case, as the predetermined probability value, 0.5 may be exemplified. It goes without saying that, when the battery pack is practically assembled, a ratio of a case in which two detection sections are in contact with the conductive member and one or more detection sections are not in contact with the conductive member do depend on a probability. What matters is that it is intended that "the conductive member is attached to the outer surface of the secondary battery" so that the probability of the case in which two detection sections are in contact with the conductive member and the probability of the case in which one or more detection sections are not in contact with the conductive member become a predetermined value such as 0.5 depending on a storage state of secondary batteries in the storage sections.

In the battery pack of the present invention or the like including the foregoing preferred mode, a mode may be employed in which two or more detection sections are provided in each of the storage sections so that a probability of a case in which two detection sections are in contact with the conductive member and a probability of a case in which one or more detection sections are not in contact with the conductive member become a predetermined value depending on a storage state of the secondary batteries in the storage sections. In this case, as the predetermined probability value, 0.5 may be exemplified. It is to be noted that it goes without saying that when the battery pack is practically assembled, a ratio of a case in which two detection sections are in contact with the conductive member and one or more detection sections are not in contact with the conductive member do depend on a probability. What matters is that it is intended that "two or more detection sections are provided in each of the storage sections" so that the probability of the case in which two detection sections are in contact with the conductive member and the probability of the case in which a one or more detection sections are not in contact with the conductive member become, for example, 0.5 depending on a storage state of secondary batteries in the storage sections.

In the battery pack of the present invention or the like including the foregoing preferred mode, a configuration may be employed in which a non-conductive member having the same appearance as that of the conductive member may be attached to the outer surface of the secondary battery made of the non-conductive material (insulating material). By attaching the non-conductive member as a dummy, it becomes difficult to distinguish the conductive member from the non-conductive member, and prevention of manufacturing an altered battery pack is allowed to be suppressed more effectively.

Further, in the battery pack of the present invention or the like including the foregoing preferred mode and the foregoing configuration, it is preferable to employ a configuration in which, when each of the secondary batteries is stored in each of the storage sections, the conductive member is not viewable. Furthermore, in the battery pack of the present invention or the like including the foregoing preferred mode and the foregoing preferred configuration, a configuration may be employed in which the conductive member or the non-conductive member may be a seal member made of a conductive material or a non-conductive material (insulating material).

Further, in the battery pack of the present invention or the like including the foregoing preferred mode and the foregoing preferred configuration and in the inspecting method according to the first embodiment of the present invention including the foregoing preferred mode and the foregoing preferred configuration, a mode may be employed in which the inspection circuit creates the first data string and obtains the second data string at predetermined time intervals.

Further, in the battery pack of the present invention or the like including the above-described preferred mode and the above-described preferred configuration, it is enough that at least two detection sections are provided in each of the storage sections, and in some cases, three or more detection sections may be provided therein. For example, the detection section may be configured of a pin-like projection section that projects from the storage section and is made of a conductive material. The housing having the plurality of storage sections may be made of a non-conductive material (insulating material) such as a plastic material. The housing including the storage section, the detection section, and a wiring extending from the detection section to the outside of the housing is allowed to be obtained by integral forming. The secondary batteries may be stored in the respective storage sections by using a machine automatically, or by an operator. The wiring extending from the detection section to the outside of the housing is connected to an inspection circuit included in the battery pack.

Here, in the battery pack of the present invention including the foregoing preferred mode and the foregoing preferred configuration and in the inspecting method according to the first embodiment of the present invention including the foregoing preferred mode and the foregoing preferred configuration, a configuration may be employed in which the first data string and the second data string may be $N_2$ bit data, for example. Specifically, for example, a secondary battery with the conductive member in contact with two detection sections is set to data "1" or data "0," and a secondary battery with the conductive member not in contact with one or more detection sections is set to data "0" or data "1," and thereby the second data string configured of "1" and "0" is allowed to be obtained. It is to be noted that, in the case where three detection sections are provided, for example, five types of datum are allowed to be obtained.

Examples of the secondary batteries include a lithium ion secondary battery. However, the secondary battery type is not limited thereto. The type of a secondary battery to be used may be selected as appropriate according to desired characteristics. The configuration and the structure of the secondary battery may be a known configuration and a known structure. The shape of the secondary battery may be a known cylindrical type or a known rectangle type.

In the battery pack of the present invention and the inspecting method according to the first embodiment or the second embodiment of the present invention, the inspection circuit includes an MPU, a memory section, and/or the like. An electric source of the inspection circuit may be the secondary batteries configuring the battery pack. The battery pack includes a known battery protection circuit. To stop a function of the battery pack, the battery protection circuit may be activated. A pulsed inspection signal may be sent from the inspection circuit to the detection section.

The battery pack in the present invention may be applied to, for example, an electric vehicle (EV), an electric motorcycle, an electric assist bicycle, an electric power tool, a home energy server (home electric power storage apparatus), a personal computer, a mobile phone, a PDA, a digital still camera, a video camcoder, a camcoder, a music player, a medical equipment, a toy, and the like.

EXAMPLE 1

Example 1 relates to the battery pack of the present invention and the method of inspecting a storage state of a secondary battery in a battery pack according to the first embodiment of the present invention. Part (A) of FIG. 4 illustrates a schematic cross-sectional view of a housing section configuring a battery pack of Example 1. Parts (B) and (C) of FIG. 4 illustrate schematic perspective views of a cylindrical-type secondary battery. Further, Parts (A) and (B) of FIG. 5 illustrate a schematic perspective view of the battery pack and a schematic view of a state in which a cover of the battery pack (closing member) is removed. Parts (A) to (F) of FIG. 6 schematically illustrate arrangement states of a secondary battery in the battery pack of Example 1 and states of contact between a detection section and a conductive member. Further, Parts (A) and (B) of FIG. 7 illustrate a conceptual diagram of an inspection circuit and the like in the battery pack of Example 1 and a diagram showing an output and the like of an inspection signal.

A battery pack 10 of Example 1 has a plurality of secondary batteries 20 and an inspection circuit (an inspection section or an inspection apparatus) 50. Further, each of the secondary batteries 20 is previously given an identification mark. Further, the plurality of secondary batteries 20 are classified into a first secondary battery group $Gp_1$ configured of secondary batteries selected from the foregoing plurality of secondary batteries 20 and a second secondary battery group $Gp_2$ configured of remaining secondary batteries not belonging to the first secondary battery group $Gp_1$. In this case, the secondary battery 20 is formed of a known cylindrical-type lithium ion secondary battery. Further, the battery pack 10 is configured of sixteen (=$N_0$) secondary batteries 20. In the battery pack 10, four secondary batteries 20 are parallel-connected, and four secondary battery groups configured of such parallel-connected secondary batteries 20 are series-connected. The first secondary battery group $Gp_1$ is configured of anterior parallel-connected two secondary battery groups (the number of the secondary batteries is eight, $N_1$ is 8, and the arrangement state is in four rows by two columns (the first row and the second row)). The second secondary battery group $Gp_2$ is configured of posterior parallel-connected two secondary battery groups (the number of the secondary batteries is eight, $N_2$ is 8, and the arrangement state is in four rows by two columns (the third row and the fourth row)). A value of $N_1/N_0$ is 0.5.

The battery pack 10 of Example 1 further includes a housing 40. The housing 40 has a plurality of storage sections 41 which respectively contain the secondary batteries 20. A conductive member 30 as an identification mark is attached to an outer surface of the secondary battery 20 made of a non-conductive material. Specifically, the non-conductive material configuring the outer surface of the secondary battery 20 is made of a polyolefin resin. The conductive member 30 is configured of a seal member made of a conductive material such as aluminum, that is, configured of a strip-shaped member in which an adhesive layer is formed on the rear surface thereof. The conductive member 30 is adhered to the outer surface of the secondary battery 20. It is to be noted that, in some cases, a seal member configured of a non-conductive member 31 such as aluminum with an alumited surface that has the same appearance as that of the conductive member 30 may be attached (adhered) to the outer surface of the secondary battery 20 made of the non-conductive material (see Part (C) of FIG. 9).

Further, each of the storage sections 41 is provided with two or more (specifically two in Example 1) detection sections 42. Depending on a storage state of the secondary battery 20 in the storage section 41, two detection sections 42 are in contact with the conductive member 30 (see Part (B) of FIG. 4), or one or more detection sections 42 are not in contact with the conductive member 30 (see Part (C) of FIG. 4). In this case, the detection section 42 is configured of a pin-like projection section made of metal (specifically, for example, nickel-gold-plated iron) projecting from the storage section 41. The housing 40 having the plurality of storage sections 41 is made of a plastic material such as an ABS resin. The housing 40 including the storage section 41, the detection section 42, and a wiring 43 extending from the detection section 42 to the outside of the housing 40 is allowed to be obtain by integral forming. When the secondary battery 20 is stored in the storage section 41, the conductive member 30 is not viewable (see Part (A) of FIG. 4). Since the foregoing configuration is adopted, a conduction state/a non-conduction state of the secondary battery 20 stored in the storage section 41 is not allowed to be viewed from the outside. Therefore, in order to check a conduction state/a non-conduction state of the secondary battery 20, the secondary battery 20 may be taken out from the storage section 41.

The wiring 43 extending from the detection section 42 to the outside of the housing 40 is connected to the inspection circuit 50 provided in the battery pack 10. The inspection circuit 50 includes an MPU 51, a programmable logic device (PLD) 52, and a memory section 53 configured of an EEROM. An electric power source of the inspection circuit 50 is the secondary batteries 20 configuring the battery pack 10. The inspection circuit 50 (more specifically, the PLD 52) sends a pulsed inspection signal to the detection section 42. By adopting the pulsed inspection signal, it becomes extremely difficult to externally analyze a method of monitoring a conduction state/a non-conduction state. The battery pack 10 includes a known battery protection circuit 54. Specifically, the battery protection circuit 54 is formed of a fuse. To stop a function of the battery pack 10, the battery protection circuit 54 is activated. That is, the fuse is melted and cut under control of the MPU 51. Alternatively, a function of an over-discharge preventive switch and/or a function of an over-charge preventive switch provided in the battery protection circuit 54 may be stopped. However, the configuration of the battery protection circuit 54 is not limited to the foregoing configuration.

The conductive member 30 is attached to the outer surface of the secondary battery 20 so that a probability of a case in which two detection sections 42 are in contact with the conductive member 30 and a probability of a case in which one or more detection sections 42 are not in contact with the conductive member 30 become a predetermined value, specifically 0.5 depending on a storage state of the secondary battery 20 in the storage section 41. More specifically, as illustrated in the conceptual view of Part (A) of FIG. 6, the conductive member 30 is adhered to a region with a length corresponding to 270 degrees along the circumference of the outer surface of the cylindrical-type secondary battery 20. Further, two or more detection sections 42 are provided in each of the storage sections 41 so that the probability of the case in which two detection sections 42 are in contact with the conductive member 30 and the probability of the case in which one or more detection sections 42 are not in contact with the conductive member 30 become a predetermined value, specifically 0.5 depending on the storage state of the secondary battery 20 in the storage section 41. More specifically, two detection sections 42 are arranged in positions separated by 90 degrees along the circumference of the outer surface of the cylindrical-type secondary battery 20.

Under the foregoing arrangement state, in the state illustrated in Part (A) of FIG. 6 (referred to as "arrangement state of 0 degree"), two detection sections 42 are in contact with the conductive member 30. Further, from "arrangement state of 90 degrees" obtained by rotating the secondary battery 20 by 90 degrees clockwise from "arrangement state of 0 degree" to "arrangement state of 180 degrees" obtained by rotating the secondary battery 20 by 180 degrees clockwise from "arrangement state of 0 degree," two detection sections 42 are in contact with the conductive member 30 (see Parts (B) and (C) of FIG. 6). In the case where the secondary battery 20 is further rotated clockwise from "arrangement state of 180 degrees," one or more detection sections 42 are not in contact with the conductive member 30 (see Part (D) of FIG. 6). Further, in "arrangement state of 270 degrees," two detection sections 42 are in contact with the conductive member 30 (see Part (E) of FIG. 6). In a state in which a rotating angle is other than 270 degrees and is less than 360 degrees, one or more detections section 42 are not in contact with the conductive member 30 (see Part (F) of FIG. 6).

In the battery pack 10 of Example 1, first, the respective eight ($=N_1$) secondary batteries 20 configuring the first secondary battery group $Gp_1$ are stored in the respective storage sections 41. By which degrees the arrangement state at this time is rotated clockwise from "arrangement state of 0 degree" shown in Part (A) of FIG. 6 is inherently at random, and depends on how each secondary battery is stored. Alternatively, the respective eight ($=N_1$) secondary batteries 20 configuring the first secondary battery group $Gp_1$ may be stored beforehand in the respective storage sections 41 based on a data string configured of "0" and "1" that are determined based on random numbers. Further, the conductive member 30 as an identification mark may be attached to the outer surface of the secondary battery 20 made of a non-conductive material is at random. In the case where all secondary batteries configuring the first secondary battery group $Gp_1$ are stored in the respective storage sections 41, the inspection circuit 50 is activated, specifically, the MPU 51 and the PLD 52 are activated, and pulsed inspection signals are sequentially sent to the inspection section 42 (see Parts (A) and (B) of FIG. 7). Thereafter, the inspection circuit 50 obtains a data string from the identification marks of the secondary batteries configuring the first secondary battery group $Gp_1$. The data string is referred to as "first secondary battery group data string" for convenience. That is, secondary batteries 20 with the conductive member 30 in contact with two detection sections 42 and secondary batteries 20 with the conductive member 30 not in contact with one or more detection sections 42 are detected to obtain the first secondary battery group data string. Further, the inspection circuit 50 further creates a first data string of secondary batteries configuring the second secondary battery group $Gp_2$ based on a predetermined arithmetic rule from the first secondary battery group data string. For the arithmetic rule, a description will be given later. It is to be noted that the secondary battery 20 with the conductive member 30 in contact with two detection sections 42 is referred to as "secondary battery in a contact state" for convenience, and the secondary battery 20 with the conductive member 30 not in contact with one or more detection sections 42 is referred to as "secondary battery in a non-contact state" for convenience.

The first data string is a data string having a length equal to the number $N_2$ of secondary batteries 20 configuring the second secondary battery group $Gp_2$, that is, $N_2$ bits. That is, for example, in the case where the secondary battery 20 with the conductive member 30 in contact with two detection sections 42 is set to data "1," and the secondary battery 20 with the conductive member 30 not in contact with one or more detection sections 42 are set to data "0," the first data string is a data string of $N_2$ bits configured of "1" and "0," and a data string created based on a predetermined arithmetic rule from an inherently-random first secondary battery group data string.

Further, the respective eight ($=N_2$) secondary batteries 20 configuring the second secondary battery group $Gp_2$ are stored in the respective storage sections 41 based on the first data string. That is, the secondary battery 20 corresponding to data "1" is stored in the storage section 41 so that two detection sections 42 are in contact with the conductive member 30. On the other hand, the secondary battery 20 corresponding to data "0" is stored in the storage section 41 so that one or more detection sections 42 are not in contact with the conductive member 30.

Thereafter, the storage sections 41 are contained in a main body section 11 of the battery pack 10, and thereover, a printed-wiring board 55 to which the MPU 51 and the like are attached is attached to the main body section 11 by an appropriate method (see Part (B) of FIG. 5). The main body section 11 is covered with a closing member (specifically, a cover) 12, a fixing member (for example, a screw) 13 is screwed into a fixing section (for example, a bush 14A provided with a tap section 14B) provided in the main body section 11 (see Parts (A) and (B) of FIG. 5). It is to be noted that referential number 15 represents an identification mark (a serial ID or a barcode) of the battery pack adhered to a side wall of the main body section 11, and referential number 16 represents an output section. It is to be noted that, although the battery pack 10 includes a known control circuit for controlling charge and discharge of the secondary batteries, such control circuit is not illustrated. Although the shape of the main body section 11 may be inherently arbitrary, the shape thereof is a rectangular solid in Example 1. An opening for taking the plurality of secondary batteries 20 in and out of the main body section 11 is provided on the top surface of the main body section 11, and the opening is sealed with the closing member 12. However, the opening may be provided on a side surface of the main body section 11, or may be provided on the bottom surface of the main body section 11.

After the battery pack 10 is assembled as described above, a pre-shipment operation check test is implemented. Specifically, the first data string of the secondary batteries configuring the second secondary battery group $Gp_2$ is created by the inspection circuit 50, based on a predetermined arithmetic rule, from the identification marks of the secondary batteries configuring the first secondary battery group $Gp_1$. Further, a second data string is obtained by examining the identification marks of the secondary batteries configuring the second secondary battery group $Gp_2$. Specifically, by activating the MPU 51 and the PLD 52, pulsed inspection signals are sequentially sent to the detection section 42. Thereby, the inspection circuit 50 obtains the second data string from the identification marks of the secondary batteries configuring the second secondary battery group $Gp_2$. That is, secondary batteries 20 with the conductive member 30 in contact with two detection sections 42 and secondary batteries 20 with the conductive member 30 not in contact with one or more detection sections 42 are detected to obtain the second data string. Further, the first data string is compared with the second data string. Comparative results thereof generally match. If the comparative results do not match, storing the secondary batteries 20 configuring the second secondary battery group $Gp_2$ into the storage sections 41 is not appropriate, and therefore storage thereof is performed again.

In the case where the battery pack 10 is practically used, the first data string is created by the inspection circuit 50 at predetermined time intervals to obtain the second data string. Specifically, first, a conduction state and a non-conduction state between detection sections of each of the secondary batteries 20 are examined at predetermined time intervals. It is to be noted that such operation of examining the conduction state and the non-conduction state between detection sections of each of the secondary batteries 20 may be started by using detecting a fact that the fixing member (screw) 13 is removed from the fixing section (the bush 14A provided with the tap section 14B) provided in the main body section 11 as a trigger as illustrated in the schematic and partial cross-sectional views of the main body section 11, the closing member (cover) 12, and the like in Parts (A) and (B) of FIG. 8, for example. For example, the fact that the fixing member 13 is removed from the bush 14A may be detected by a method of detecting non-conduction between the bush 14A and the fixing member 13 by the fact that the fixing member 13 is removed from the bush 14A provided with the tap section 14B.

Specifically, the main body section 11 is made of a non-conductive material (insulating material) such as a plastic material. Further, the bush 14A made of a conductive material, specifically, a metal or an alloy (more specifically, stainless steel) is attached to the fixing section to which the fixing member 13 is attached in the main body section 11. The bush 14A is connected to the inspection circuit 50 through a first wiring 17 and an unillustrated connector. It is to be noted that the first wiring 17 is attached to the bush 14A by welding. The bush 14A is engaged with the fixing member 13. This is allowed to be obtained by integrally forming the bush 14A and the main body section 11. Further, the closing member 12 is made of a non-conducive material (insulating material) such as a plastic material. The fixing member 13 attached to the closing member 12 is connected to the inspection circuit 50 through second wirings 18A and 18B and an unillustrated wiring. Specifically, the fixing member 13 is grounded through the second wirings 18A and 18B and the unillustrated wiring. One end of the unillustrated wiring is electrically connected to the first wiring 18A through a fixing screw (not illustrated) made of stainless steel. 18B as part of the second wiring is provided with a through-hole 19 that allows the fixing member 13 to pass therethrough. This is allowed to be obtained by integrally forming the second wirings 18A and 18B and the closing member 12. The fixing member 13 is formed of a screw made of a conductive material (for example, metal or an alloy), specifically a screw made of stainless steel.

Moreover, based on the foregoing trigger, more specifically, based on an action of an unillustrated timer provided in the inspection circuit 50, the MPU 51 and the PLD 52 are activated to sequentially send pulsed inspection signals to the detection sections 42 in the respective storage sections 41. Further, the secondary batteries 20 in a contact state and the secondary batteries 20 in a non-contact state are detected. As a predetermined time interval from detection of one secondary battery to detection of the next secondary battery, a value in the range from 10 milliseconds to 1 second both inclusive may be exemplified. However, the predetermined time interval is not limited to the foregoing value. In the case where the foregoing time interval is adopted, as described later, a state that the secondary battery 20 is taken out from the storage section 41 is securely allowed to be detected.

Further, the inspection circuit 50 creates the first data string of the secondary batteries configuring the second secondary battery group $Gp_2$, based on a predetermined arithmetic rule, from the identification marks of the secondary batteries 20 configuring the first secondary battery group $Gp_1$. That is, in a manner similar to the foregoing manner, the inspection circuit 50 is activated, specifically, the MPU 51 and the PLD 52 are activated to sequentially send pulsed inspection signals to the inspection sections 42. Further, the inspection circuit 50 obtains the first secondary battery group data string from the identification marks of the secondary batteries configuring the first secondary battery group $Gp_1$. More specifically, secondary batteries 20 with the conductive member 30 in contact with two detection sections 42 and secondary batteries 20 with the conductive member 30 not in contact with one or more detection sections 42 are detected to obtain the first secondary battery group data string. Further, the inspection circuit 50 creates the first data string of the secondary batteries configuring the second secondary battery group $Gp_2$, based on a predetermined arithmetic rule, from the first secondary battery group data string.

Further, the inspection circuit 50 obtains the second data string by examining the identification marks of the secondary batteries configuring the second secondary battery group $Gp_2$. That is, in a manner similar to the foregoing manner, the inspection circuit 50 is activated, specifically, the MPU 51 and the PLD 52 are activated to sequentially send pulsed inspection signals to the detection sections 42. Further, the inspection circuit 50 obtains the second data string from the identification marks of the secondary batteries configuring the second secondary battery group $Gp_2$. More specifically, secondary batteries 20 with the conductive member 30 in contact with two detection sections 42 and secondary batteries 20 with the conductive member 30 not in contact with one or more detection sections 42 are detected to obtain the second data string.

Thereafter, the inspection circuit 50 compares the first data string to the second data string. If the first data string and the second data string do not match, a function of the battery pack 10 is stopped. That is, if the first and second data string do not match, the battery pack 10 is identified as an altered battery pack, and the function of the battery pack 10 is stopped by an action of the battery protective circuit 54.

A description will be given below of an example of the predetermined arithmetic rule. However, the predetermined arithmetic rule is not limited to the following example. It is to be noted that, in the battery pack 10, as described above, four secondary battery groups are series-connected. The first secondary battery group $Gp_1$ is in an arrangement state of four rows by two columns (the first row and the second row), and the second secondary battery group $Gp_2$ is in an arrangement state of four rows by two columns (the third row and the fourth row).

For example, an arrangement state of the eight secondary batteries 20 configuring the first secondary battery group $Gp_1$ in the storage sections 41 may be the arrangement state corresponding to the first secondary battery group data string as illustrated in Part (A) of FIG. 1. Further, an operator determination table illustrated in Part (B) of FIG. 1 may be stored in the memory section 53 of the inspection circuit 50. In this case, in the case where data indicating a contact state/a non-contact state of two secondary batteries is "00," a corresponding operator is set to "AND." Further, in the case where data indicating a contact state/a non-contact state of two secondary batteries is "01," a corresponding operator is set to "OR." Further, in the case where data indicating a contact state/a non-contact state of two secondary batteries is "10," a corresponding operator is set to "XOR." Further, in the case where data indicating a contact state/a non-contact state of two secondary batteries is "11," a corresponding operator is set to "NAND."

Further, attention is focused on a data string of the first row determined at random, for example, "1001," and an operator for creating a data string of the third row circularly from data indicating a contact state/a non-contact state of adjacent two secondary batteries is determined. That is, since data of the first column and the second column is "10," the first operator is "XOR." Further, since data of the second column and the third column is "00," the second operator is "AND." Further, since data of the third column and the fourth column is "01," the third operator is "OR." Further, since data of the fourth column and the first column is "11," the fourth operator is "NAND" (for the foregoing description, see Part (C) of FIG. 1).

Next, attention is focused on a data string of the second row determined at random, for example, "0111," and an operator is activated between adjacent two pieces of data. Specifically, for data "01" configured of data of the first column and the second column, the first operator "XOR" is activated, and as a result, "1" is obtained as data of (the third row, the first column). Further, for data "11" of the second column and the third column, the second operator "AND" is activated, and as a result, "1" is obtained as data of (the third row, the second column). Further, for data "11" of data of the third column and the fourth column, the third operator "OR" is activated, and as a result, "1" is obtained as data of (the third row, the third column). Further, for data "10" of the fourth column and the first column, the fourth operator "NAND" is activated, and as a result, "1" is obtained as data of (the third row, the fourth column). As described above, as a data string of the third row, "1111" is obtained (see Part (C) of FIG. 1).

Next, data of (the fourth row, the first column) is obtained from parity of data of the first column in the first row, the second row, and the third row. Specifically, since the data of the first column in the first row, the second row, and the third row is "101," that is, an even number, the data of (the fourth row, the first column) is "0." Further, since data of the second column in the first row, the second row, and the third row is "011," that is, an even number, data of (the fourth row, the second column) is "0." Further, since data of the third column in the first row, the second row, and the third row is "011," that is, an even number, data of (the fourth row, the third column) is "0." Further, since data of the fourth column in the first row, the second row, and the third row is "111," that is, an odd number, data of (the fourth row, the fourth column) is "1." Accordingly, as a data string of the fourth row, "0001" is obtained (see Part (D) of FIG. 1).

In the case where first data string "11110001" obtained as above matches the second data string obtained by examining the identification marks of the secondary batteries configuring the second secondary battery group $Gp_2$, the battery pack 10 is identified as a non-altered battery pack, and a function of the battery pack 10 is not stopped.

For example, from the state illustrated in Part (A) of FIG. 2, as illustrated in Part (B) of FIG. 2, a "secondary battery in a contact state" of (the first row, the first column) may be taken out from the storage section 41, and a/the secondary battery may be stored again. At this time, the secondary battery may become a "secondary battery in a non-contact state." That is, data thereof is changed from "1" to "0." It is to be noted that the stored secondary battery may be the secondary battery previously taken out, or may be a different secondary battery. This is similarly applied to the following description. Further, in the case where a "secondary battery in a contact state" in the second secondary battery group $Gp_2$ is taken out from the storage section 41, and an operation of examining the identification marks of the secondary batteries configuring the second secondary battery group is started before a/the secondary battery is stored again, data thereof is changed from "1" to "0" as well. In this case, the first data string obtained in this state is as illustrated in Part (C) of FIG. 2. In the first data string, data corresponding to the secondary battery of (the third row, the first column) is changed from "1" to "0." However, data corresponding to the secondary battery of (the third row, the first column) in the second data string obtained by examining the identification marks of the secondary batteries configuring the second secondary battery group $Gp_2$ remains as "1." Therefore, the first data string and the second data string do not match. Therefore, the battery protection circuit 54 is activated to stop a function of the battery pack.

Further, for example, from the state illustrated in Part (A) of FIG. 2, as illustrated in Part (D) of FIG. 2, a "secondary battery in a contact state" of (the second row, the second column) may be taken out from the storage section 41, and a/the secondary battery may be stored again. At this time, the secondary battery may become a "secondary battery in a non-contact state." That is, data thereof is changed from "1" to "0." Further, in the case where a "secondary battery in a contact state" in the second secondary battery group $Gp_2$ is taken out from the storage section 41 and an operation of examining the identification marks of the secondary batteries configuring the second secondary battery group is started before a/the secondary battery is stored again, data thereof is changed from "1" to "0" as well. In this case, the first data string obtained in this state is as illustrated in Part (E) of FIG. 2. In the first data string, data corresponding to the secondary battery of (the third row, the first column), the secondary battery of (the third row, the second column), and the secondary battery of (the fourth row, the first column) is changed. However, data corresponding to the secondary battery of (the third row, the first column), the secondary battery of (the third row, the second column), and the secondary battery of (the fourth row, the first column) in the second data string obtained by examining the identification marks of the secondary batteries configuring the second secondary battery group $Gp_2$ is not changed. Therefore, the first data string and the second data string do not match. Therefore, the battery protection circuit 54 is activated to stop a function of the battery pack.

For example, a "secondary battery in a contact state" in the second secondary battery group $Gp_2$ is taken out from the storage section 41, and a/the secondary battery is stored again. At this time, the secondary battery may become a "secondary battery in a non-contact state." In this case, the second data string is changed. As a result, the first data string and the second data string do not match. Further, in the case where a "secondary battery in a contact state" in the second secondary battery group $Gp_2$ is taken out from the storage section 41 and an operation of examining the identification marks of the secondary batteries configuring the second secondary battery group is started before a/the secondary battery is stored again, the second data string is changed as well. As a result, the first data string and the second data string do not match. Furthermore, for example, a "secondary battery in a non-contact state" in the second secondary battery group $Gp_2$ is taken out from the storage section 41, a/the secondary battery is stored again, and the stored secondary battery may become a "secondary battery in a contact state." In this case, the second data string is changed as well. As a result, the first data string and the second data string do not match. Therefore, in these cases, the battery protection circuit 54 may be activated to stop a function of the battery pack.

A description will be hereinafter given of an example in which a contact state/a non-contact state of the secondary batteries is changed to 3 bits.

For example, an arrangement state of the eight secondary batteries 20 configuring the first secondary battery group $Gp_1$ in the storage sections 41 may be the arrangement state corresponding to the first secondary battery group data string as illustrated in Part (A) of FIG. 3. Further, the operator determination table illustrated in Part (B) of FIG. 3 may be stored in the memory section 53 of the inspection circuit 50.

In this case, data of (the first row, the first column) is shifted by 1 bit, and is added to data of (the first row, the second column). Next, the resultant is divided by "6." The operator illustrated in Part (B) of FIG. 3 corresponding to the residual value is determined as the first operator. Further, data of (the first row, the second column) is shifted by 1 bit, and is added to data of (the first row, the third column). Next, the resultant is divided by "6." The operator illustrated in Part (B) of FIG. 3 corresponding to the residual value is determined as the second operator. Further, data of (the first row, the third column) is shifted by 1 bit, and is added to data of (the first row, the fourth column). Next, the resultant is divided by "6." The operator illustrated in Part (B) of FIG. 3 corresponding to the residual value is determined as the third operator. Further, data of (the first row, the fourth column) is shifted by 1 bit, and is added to data of (the first row, the first column). Next, the resultant is divided by "6." The operator illustrated in Part (B) of FIG. 3 corresponding to the residual number is determined as the fourth operator.

Thereafter, the first operator acts on data of (the second row, the first column) and data of (the second row, the second column) to obtain data of (the third row, the first column). Further, the second operator acts on data of (the second row, the second column) and data of (the second row, the third column) to obtain data of (the third row, the second column). Further, the third operator acts on data of (the second row, the second column) and data of (the second row, the fourth column) to obtain data of (the third row, the third column). Further, the fourth operator acts on data of (the second row, the fourth column) and data of (the second row, the first column) to obtain data of (the third row, the fourth column).

Next, data of (the fourth row, the first column) is obtained from [{(the first row, the first column) XOR (the second row, the first column)} XOR (the third row, the first column)].

Further, data of (the fourth row, the second column) is obtained from [{(the first row, the second column) XOR (the second row, the second column)} XOR (the third row, the second column)]. Further, data of (the fourth row, the third column) is obtained from [{(the first row, the third column) XOR (the second row, the third column)} XOR (the third row, the third column)]. Further, data of (the fourth row, the fourth column) is obtained from [{(the first row, the fourth column) XOR (the second row, the fourth column)} XOR (the third row, the fourth column)].

Accordingly, data string "2701" of the third row and data string "0420" of the fourth row are obtained from data string "7242" of the first row and data string "5163" of the second row.

For example, from the state illustrated in Part (A) of FIG. 3, as illustrated in Part (C) of FIG. 3, the secondary battery having the data of (the second row, the second column) is taken out from the storage section 41, and a/the secondary battery is stored again. At this time, data of the secondary battery may become "0." At this time, the first data string obtained from this state is as illustrated in Part (D) of FIG. 3. In the first data string, data corresponding to the secondary battery of (the third row, the second column) is changed from "7" to "6." However, data corresponding to the secondary battery of (the third row, the second column) in the second data string obtained by examining the identification marks of the secondary batteries configuring the second secondary battery group $Gp_2$ remains as "7." Therefore, the first data string and the second data string do not match. Therefore, the battery protection circuit 54 is activated to stop a function of the battery pack.

For example, similarly, from the state illustrated in Part (A) of FIG. 3, as illustrated in Part (E) of FIG. 3, the secondary battery having the data of (the first row, the first column) may be taken out from the storage section 41, and a/the secondary battery may be stored again. At this time, data of the secondary battery may become "3." Then, the first data string obtained from this state is as illustrated in Part (F) of FIG. 3. In the first data string, data corresponding to the secondary battery of (the third row, the first column), the secondary battery of (the third row, the fourth column), the secondary battery of (the fourth row, the first column), and the secondary battery of (the fourth row, the fourth column) are changed from "2," "1," "0," and "0" to "4," "7," "2," and "6." However, the second data string obtained by examining the identification marks of the secondary batteries configuring the second secondary battery group $Gp_2$ is not changed. Therefore, the first data string and the second data string do not match. Therefore, the battery protection circuit 54 is activated to stop a function of the battery pack.

For example, similarly, from the state illustrated in Part (A) of FIG. 3, as illustrated in Part (G) of FIG. 3, the secondary battery having the data of (the second row, the fourth column) may be taken out from the storage section 41, and a/the secondary battery may be stored again. At this time, data of the secondary battery may become "6." Then, the first data string obtained from this state becomes as illustrated in Part (H) of FIG. 3. In the first data string, data corresponding to the secondary battery of (the third row, the third column), the secondary battery of (the third row, the fourth column), and the secondary battery of (the fourth row, the third column) are changed from "0," "1," and "2" to "1," "4," and "3." However, the second data string obtained by examining the identification marks of the secondary batteries configuring the second secondary battery group $Gp_2$ is not changed. Therefore, the first data string and the second data string do not match. Therefore, the battery protection circuit 54 is activated to stop a function of the battery pack.

For example, similarly, from the state illustrated in Part (A) of FIG. 3, as illustrated in Part (I) of FIG. 3, the secondary battery having the data of (the first row, the third column) may be taken out from the storage section 41, and a/the secondary battery may be stored again. At this time, data of the secondary battery may become "5." Then, the first data string obtained from this state becomes as illustrated in Part (J) of FIG. 3. In the first data string, data corresponding to the secondary battery of (the third row, the third column) and the secondary battery of (the fourth row, the third column) are changed from "0" and "2" to "2," and "1." However, the second data string obtained by examining the identification marks of the secondary batteries configuring the second secondary battery group $Gp_2$ is not changed. Therefore, the first data string and the second data string do not match. Therefore, the battery protection circuit 54 is activated to stop a function of the battery pack.

In the foregoing description, for simplifying operations, the first secondary battery group $Gp_1$ is in a state of arrangement of four rows by two columns (the first row and the second row), and the second secondary battery group $Gp_2$ is in a state of arrangement of four rows by two columns (the third row and the fourth row). In practice, positions and the number of the secondary batteries configuring the first secondary battery group $Gp_1$ and alignment sequence of the secondary batteries are known only by a manufacturer and/or the like. Therefore, even if any of the secondary batteries 20 is taken out from the storage section 41 and a/the secondary battery is stored in the storage section 41 again, probability that the first data string do not unmatch with the second data string is extremely small. Accordingly, in the case where once the secondary battery 20 is taken out from the storage section 41 and thereafter, a/the secondary battery 20 is stored in the storage section 41 again, the fact that the secondary battery 20 is taken out from the storage section 41 is allowed to be detected with high probability regardless of which secondary battery 20 is stored. Furthermore, in the case where a predetermined arithmetic rule is separately stored in an integrated circuit, it is extremely difficult to know an inspecting method from the outside.

It is to be noted that positions and the number of the secondary batteries configuring the first secondary battery group $Gp_1$ and alignment sequence of the secondary batteries may be, for example, previously determined under a certain rule correspondingly to the identification mark (serial ID) of the battery pack. Alternatively, a manufacturer and/or the like may record and archive them correspondingly to the identification mark (serial ID) of the battery pack. In this case, the positions of the secondary batteries configuring the first secondary battery group $Gp_1$ represent that the secondary battery in which order in all $N_0$ pieces of secondary batteries belongs to the first secondary battery group $Gp_1$. Further, the alignment sequence of the secondary batteries configuring the first secondary battery group $Gp_1$ represent data of the secondary battery in which order corresponds to the data in which order in the first second battery group data string, in $N_1$ pieces of secondary batteries configuring the first secondary battery group $Gp_1$. Further, a plurality of predetermined arithmetic rules may be included, and which predetermined arithmetic rule is used may be previously determined under a certain rule correspondingly to the identification mark (serial ID) of the battery pack. Alternatively, a manufacturer and/or the like may record and archive which predetermined arithmetic rule is used correspondingly to the identification mark (serial ID) of the battery pack. In this case, it is enough that a selection switch to designate which predetermined arithmetic rule is to be selected is provided. In the case where a wrong switch is selected, the first data string is not matched with the second data string. Alternatively, it is possible to determine which predetermined arithmetic rule is to be used by which fixing member (screw 13) is firstly removed from the fixing section (bush in which the tap section 14 is provided). Also, it is enough that a relation between the firstly-removed fixing member (screw 13) and a predetermined arithmetic rule that should be used is stored in the inspection circuit 50.

In the case where replacement of the secondary battery 20 in the battery pack 10, repair of the battery pack 10, and/or the like are made by a manufacturer and/or the like, since the manufacturer and/or the like knows the predetermined arithmetic rule, the manufacturer and/or the like knows whether a removed secondary battery that has been stored in a storage section belongs to the first secondary battery group or to the second secondary battery group and knows which storage section is to be affected by the foregoing removal of the secondary battery. Therefore, a plurality of necessary secondary batteries may be removed, and secondary batteries in the predetermined contact state or in the non-contact state may be stored again in the storage sections from which the secondary batteries are removed based on positions of the storage sections from which the secondary batteries should be removed and the predetermined arithmetic rule.

In the battery pack of Example 1 and the inspecting method of Example 1, the first data string of the secondary batteries configuring the second secondary battery group is created, based on the predetermined arithmetic rule, from the identification marks (identification information or indexes) of the secondary batteries configuring the first secondary battery group, and the second data string is obtained by examining the identification marks of the secondary batteries configuring the second secondary battery group. Further, in an inspecting method of Example 2 described later, charge current change in the secondary batteries configuring the first secondary battery group is formed into data to create the first data string of the secondary batteries configuring the second secondary battery group based on a predetermined arithmetic rule, and charge current change in the secondary batteries configuring the second secondary battery group is formed into data to create the second data string. That is, it is not necessary to store the first data string in the inspection circuit and to store an arrangement state of the secondary batteries in the inspection circuit, and it is enough that only the predetermined operation rule is stored in the inspection circuit. Therefore, it is possible to easily, appropriately, and safely detect alteration of a battery pack that is an attempt to improperly replace a secondary battery, and to securely prevent manufacture of an altered battery pack. Further, in the case where a secondary battery, a printed board including an inspection circuit, and/or the like are replaced by a manufacturer and/or the like, it is not necessary to rewrite various information.

Further, in the battery pack of Example 1, the conductive member is attached to the outer surface of the secondary battery made of a non-conductive material (insulating material). Although the battery pack of Example 1 has a simple structure and a simple configuration in which two or more detection sections are provided in each of the storage sections, taking out a secondary battery and re-storage of a/the secondary battery are allowed to be recognized. Therefore, alteration of a battery pack such as improper replacement of a secondary battery is allowed to be appropriately and easily detected, and manufacturing an altered battery pack is allowed to be securely prevented.

EXAMPLE 2

Example 2 relates to the battery pack of the present invention and the method of inspecting a storage state of a secondary battery according to the second embodiment of the present invention. The inspecting method of Example 2 is a method of inspecting a storage state of secondary batteries in a battery pack having a plurality of secondary batteries and the inspection circuit 50. In this case, as in Example 1, the plurality of secondary batteries are classified into the first secondary battery group $Gp_1$ configured of secondary batteries selected from the foregoing plurality of secondary batteries and a second secondary battery group $Gp_2$ configured of remaining secondary batteries not belonging to the first secondary battery group $Gp_1$.

Further, at the time of charging secondary batteries, by the inspection circuit 50, charge current change in the secondary batteries configuring the first secondary battery group $Gp_1$ is formed into data to create the first data string of the secondary batteries configuring the second secondary battery group $Gp_2$ based on a predetermined arithmetic rule, and charge current change in the secondary batteries configuring the second secondary battery group $Gp_2$ is formed into data to obtain the second data string. Thereafter, the first data string is compared to the second data string. If the first and second data strings do not match, a function of the battery pack is stopped.

In general, charge current change in secondary batteries varies according to each secondary battery. Therefore, such charge current change may be generally classified into two charge current changes. For example, at the time of constant-current (CC) charge, a current corresponding to individual difference of internal resistance flows in each secondary battery. Therefore, charge current change may be classified into two groups by classifying (quantizing) current values flowing in the respective secondary batteries into "0" and "1" when a voltage of the whole battery pack becomes a certain value. In this case, one of two charge current changes is referred to as the first classification, and the other thereof is referred to as the second classification. Secondary batteries belonging to the first classification are indicated by data "1," and secondary batteries belonging to the second classification are indicated by data "0".

Accordingly, charge current change in the secondary batteries configuring the first secondary battery group $Gp_1$ is allowed to be formed into data as "0" or "1," and charge current change in the secondary batteries configuring the second secondary battery group $Gp_2$ is allowed to be formed into data as "0" or "1." Further, in this case, in a manner completely similar to that in the description in Example 1, the first data string of the secondary batteries configuring the second secondary battery group $Gp_2$ is allowed to be created based on a predetermined arithmetic rule, and charge current change in the secondary batteries configuring the second secondary battery group $Gp_2$ is allowed to be formed into data to obtain the second data string. Thereafter, the first data string is compared to the second data string. If the first and second data strings do not match, a function of the battery pack is stopped. More specific operation may be similar to that described in Example 1, and therefore, detailed description thereof will be omitted.

It is to be noted that, in Example 2, in the case where a secondary battery is degraded, in some cases, classification of the secondary battery is changed from the first classification to the second classification, or in other cases, classification of the secondary battery is changed from the second classification to the first classification. Such change also results in a state that the first data string and the second data string do not match. As described above, degradation of a secondary battery may be determined as well.

The present invention has been described with reference to the preferred examples. However, the present invention is not limited to the foregoing examples. The configurations and the structures of the battery pack, the secondary battery, the housing, the conductive member, the detection section, the inspection circuit, and the like and the arithmetic rules are merely exemplifications, and may be changed as appropriate. For example, in the examples, the cylindrical-type secondary battery is used. However, as illustrated in Parts (A) to (C) of FIG. 9, a secondary battery 120 may be formed of a known square-type lithium ion secondary battery. Part (A) of FIG. 9 illustrates the secondary battery 120 with the conductive member 30 in contact with two detection sections 42, and Part (B) of FIG. 9 illustrates the secondary battery 120 with the conductive member 30 not in contact with one or more detection sections 42. Further, Part (C) of FIG. 9 illustrates the secondary battery 120 with the non-conductive member 31 in contact with two detection sections 42, and Part (D) of FIG. 9 illustrates the secondary battery 120 with the conductive member 30 not in contact with two detection sections 42. It is to be noted that the secondary battery 120 in Part (A) of FIG. 9 is stored in the storage section 41 in an inverted state with respect to the secondary battery 120 in Part (D) of FIG. 9. Whether the secondary battery 120 is in the storage state illustrated in Part (A) of FIG. 9 or in the storage state illustrated in Part (D) of FIG. 9 is inherently at random, and depends on how each secondary battery is stored.

Instead of providing the conductive member and the detection section, an IC tag to give a unique identification mark to each secondary battery may be arranged in each secondary battery. Further, the detection apparatus (Example 1) according to the first embodiment of the present invention and the inspecting method (Example 2) according to the second embodiment of the present invention may be combined.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack, comprising:
a plurality of secondary batteries; and
at least one processor,
wherein each of the plurality of secondary batteries has an identification mark,
wherein the identification mark of a secondary battery of the plurality of secondary batteries is attached to an outer surface of the secondary battery,
wherein the outer surface of the secondary battery is made of a non-conductive material, and
wherein, the plurality of secondary batteries are classified into a first secondary battery group that includes a first set of secondary batteries of the plurality of secondary batteries, and a second secondary battery group that includes a second set of secondary batteries of the plurality of secondary batteries, the first set of secondary batteries different from the second set of secondary batteries,
wherein the at least one processor is programmed to:
create a first data string of the second set of secondary batteries, based on an arithmetic rule, from first identification marks of the first set of secondary batteries,
obtain a second data string by examination of second identification marks of the second set of secondary batteries,
compare the first data string with the second data string, and
control a function of the battery pack based on a difference in the first data string and the second data string.

2. The battery pack according to claim 1,
wherein a first number of the plurality of secondary batteries is $N_0$, and a second number of the first set of secondary batteries is $N_1$,
wherein $N_0$ is greater than or equal to 2, and
wherein a ratio of $N_1/N_0$ is a range of 0.25 to 0.75.

3. The battery pack according to claim 1, further comprising:
a housing that has a plurality of storage sections,
wherein the plurality of storage sections include the plurality of secondary batteries,
wherein a conductive member as the identification mark is attached to corresponding outer surface of each of the plurality of secondary batteries,
wherein each of the plurality of storage sections includes at least two detection sections, and
wherein each of the at least two detection sections is in contact with the conductive member, or at least one of the at least two detection sections is disconnected from the conductive member, based on a storage state of each of the plurality of secondary batteries.

4. The battery pack according to claim 3, wherein based on the storage state of each of the plurality of secondary batteries in the plurality of storage sections, the conductive member is attached to the corresponding outer surface of each of the plurality of secondary batteries such that a first probability of a first case in which each of the at least two detection sections is in contact with the conductive member is equal to a value, and a second probability of a second case in which at least one of the at least two detection sections is disconnected from the conductive member is equal to the value.

5. The battery pack according to claim 3, wherein based on the storage state of each of the plurality of secondary batteries in the plurality of storage sections, the at least two detection sections are included in each of the plurality of storage sections such that a first probability of a first case in which each of the at least two detection sections in contact with the conductive member is equal to a value, and a second probability of a second case in which at least one of the at least two detection sections is disconnected from the conductive member is equal to the value.

6. The battery pack according to claim 3, wherein the non-conductive material has an appearance that is same as an appearance of the conductive member attached to the corresponding outer surface of each of the plurality of secondary batteries.

7. The battery pack according to claim 3, wherein
the conductive member is hidden inside the housing, based on storage of the plurality of secondary batteries in the plurality of storage sections.
8. The battery pack according to claim 3, wherein
the conductive member is a seal member made of a conductive material.
9. A battery pack, comprising:
a plurality of secondary batteries; and
at least one circuit,
wherein each of the plurality of secondary batteries has an identification mark,
wherein the identification mark of a secondary battery of the plurality of secondary batteries is attached to an outer surface of the secondary battery,
wherein, the plurality of secondary batteries are classified into a first secondary battery group that includes a first set of secondary batteries of the plurality of secondary batteries, and a second secondary battery group that includes a second set of secondary batteries of the plurality of secondary batteries, the first set of secondary batteries different from the second set of secondary batteries, and
wherein the at least one circuit is programmed to:
create a first data string of the second set of secondary batteries, based on an arithmetic rule, from first identification marks of the first set of secondary batteries,
obtain a second data string by examination of second identification marks of the second set of secondary batteries,
compare the first data string with the second data string, and
control a function of the battery pack based on a difference in the first data string and the second data string.

* * * * *